US012308510B2

(12) United States Patent
Kim

(10) Patent No.: US 12,308,510 B2
(45) Date of Patent: May 20, 2025

(54) TERAHERTZ BAND WAVEGUIDE MODULE AND MOUNTING METHOD OF IC CHIP

(71) Applicant: KOREA UNIVERSITY RESEARCH AND BUSINESS FOUNDATION, Seoul (KR)

(72) Inventor: Moonil Kim, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 16 days.

(21) Appl. No.: 18/086,852

(22) Filed: Dec. 22, 2022

(65) Prior Publication Data

US 2024/0021999 A1 Jan. 18, 2024

(30) Foreign Application Priority Data

Jul. 12, 2022 (KR) ........................ 10-2022-0085563

(51) Int. Cl.

| | |
|---|---|
| ***H01Q 1/22*** | (2006.01) |
| ***H01P 3/12*** | (2006.01) |
| ***H01Q 9/16*** | (2006.01) |
| ***H01Q 13/06*** | (2006.01) |
| ***H01Q 23/00*** | (2006.01) |

(52) U.S. Cl.

CPC ............. *H01Q 1/2283* (2013.01); *H01P 3/12* (2013.01); *H01Q 9/16* (2013.01); *H01Q 13/06* (2013.01); *H01Q 23/00* (2013.01)

(58) Field of Classification Search

CPC ........ H01Q 1/22; H01Q 1/2283; H01Q 5/378; H01Q 9/0485; H01Q 9/065; H01Q 9/16; H01Q 9/285; H01Q 21/08; H01Q 21/10; H01Q 23/00; H01Q 13/06; H01P 1/20309; H01P 7/06; H01P 11/001; H01P 11/002; H01L 23/66; H01L 2223/6677; H01L 23/6627

See application file for complete search history.

(56) References Cited

U.S. PATENT DOCUMENTS

| | | | | |
|---|---|---|---|---|
| 10,381,317 B2 * | 8/2019 | Maaskant | ............... | H01P 5/024 |
| 2005/0264372 A1 * | 12/2005 | Choudhury | ............. | H01L 23/66 333/33 |
| 2022/0021473 A1 | 1/2022 | Dong et al. | | |

FOREIGN PATENT DOCUMENTS

KR 10-2000-0029293 A 5/2000

OTHER PUBLICATIONS

Lee, Juhee, et al. "WR-3.4 Overmoded Waveguide Module for the Packaging of a Linear Integrated-Circuit Array." Electronics 11.13 (2022): 2091., (6 pages).

Korean Office Action issued on Nov. 30, 2023, in counterpart Korean Patent Application No. 10-2022-0085563 (5 pages in Korean).

* cited by examiner

*Primary Examiner* — Robert Karacsony

(74) *Attorney, Agent, or Firm* — NSIP Law

(57) ABSTRACT

Disclosed are a terahertz band waveguide module and a mounting method of an IC chip. The terahertz band waveguide module includes: a waveguide having a channel having a first size based on an E-plane; and an IC chip having a width of a second size and disposed at a preset position inside the waveguide, wherein the IC chip is disposed inside the waveguide with an air gap on at least two surfaces of the IC chip.

7 Claims, 14 Drawing Sheets

TERAHERTZ BAND WAVEGUIDE MODULE AND MOUNTING METHOD OF IC CHIP

CROSS-REFERENCE TO RELATED APPLICATION

This application claims priority under 35 U.S.C. § 119(a) to Korean Patent Application No. 10-2022-0085563 filed on Jul. 12, 2022, in the Korean Intellectual Property Office, the disclosure of which is incorporated herein by reference in its entirety.

BACKGROUND

(a) Technical Field

The present invention relates to a terahertz band metallic waveguide module, a mounting method of an integrated circuit (IC) chip, and a design of the IC chip.

(b) Background Art

A WR-3.4 wavelength band, which is known as H-band, includes a frequency communication band in the range of 252 to 320 GHz according to the most recent IEEE wireless communication standard 802.3.15d. Such a communication band provides low atmospheric attenuation suitable for short-range and high-speed communication systems. In order to conveniently assemble the front-end communication system in the WR 3.4 band similarly to a low frequency band, discrete circuit components packaged in a waveguide module are required.

In general, a bonding wire method has been conventionally used to couple an IC chip to a waveguide or a substrate in an RF frequency band. However, when the IC chip is mounted on a WR-3.4 waveguide of a very high frequency through the bonding wire method, there is a problem in that a large loss occurs in interconnecting the substrate and the IC chip, and complexity of circuit assembly increases.

SUMMARY OF THE INVENTION

An aspect of the present invention is to provide a terahertz band waveguide module and a mounting method of an IC chip.

Another aspect of the present invention is to provide a terahertz band waveguide module and a mounting method of an IC chip capable of mounting a semiconductor IC chip inside a waveguide without using a bonding wire and without an additional substrate.

Still another aspect of the present invention is to provide a terahertz band waveguide module and a mounting method of an IC chip capable of directly transmitting and receiving radio waves with a waveguide by including an antenna inside a semiconductor IC chip.

According to an aspect of the present invention, there is provided a terahertz band waveguide.

According to an exemplary embodiment of the present invention, there is provided a waveguide module including: a waveguide having a channel having a first size based on an E-plane; and an IC chip having a width of a second size and disposed at a preset position inside the waveguide, wherein the IC chip is disposed inside the waveguide with an air gap of a small size in order to prevent damage to the IC chip.

The waveguide may have a size exactly the same or close to that of a WR-3.4 standard waveguide, the first size may be greater than the second size. The air gap may be formed at the top and bottom between the IC chip and the waveguide walls, respectively, and the air gap may be set to 30 μm or less, preferably 20 μm.

The IC chip may include a dipole antenna, and the dipole antenna included in the IC chip may be designed in consideration of a size of the air gap.

The IC chip may be formed with substrate vias for suppressing dielectric resonance inside the IC chip, and the via may be formed by selecting an optimal position depending on the size of the IC chip, including a distance spaced apart from the outermost portion of the IC chip by 355 μm.

The IC chip may be formed with an amplifier circuit or an array circuit including a plurality of amplifier circuit units.

The plurality of amplifier circuits may be mounted in a size of an extended waveguide rather than a size of a standard waveguide.

Two amplifier circuit units positioned outside the array circuit among the plurality of amplifier circuit units included in the array circuit may have an antenna structure designed differently from the plurality of amplifier circuit units positioned inside the array circuit due to the air gap.

According to another aspect of the present invention, there is provided a process of mounting an IC chip inside a waveguide.

According to an exemplary embodiment of the present invention, there is provided a method of mounting an IC chip inside a waveguide including: a first process of providing the IC chip having a dipole antenna; and a second process of mounting the IC chip in a preset area inside the waveguide, the IC chip being mounted inside the waveguide so as to have an air gap on at least two surfaces of the IC chip without a bonding wire, wherein the waveguide has a channel of a first size based on an E-plane, and the IC chip has a width of a second size.

By providing the terahertz band waveguide module and the mounting method of the IC chip according to an exemplary embodiment of the present invention, a waveguide module in which a semiconductor IC chip is mounted inside the waveguide may be manufactured without using a bonding wire and without an additional substrate.

Further, according to the present invention, it is possible to directly transmit and receive radio waves with a waveguide by including an antenna inside a semiconductor IC chip.

DETAILED DESCRIPTION

Singular expressions used herein include plural expressions unless the context clearly dictates otherwise. In the present specification, terms such as "configured" or "including" should not be construed as necessarily including all of the various components or steps described in the specification, and it should be construed that some components or steps among the components or steps may not be included, or additional components or steps may be further included. In addition, the terms "part", "module", and the like, described herein mean a unit of processing at least one function or operation, and may be implemented by hardware or software or a combination of hardware and software.

Hereinafter, exemplary embodiments of the present invention will be described in detail with reference to the accompanying drawings.

Figure 1:
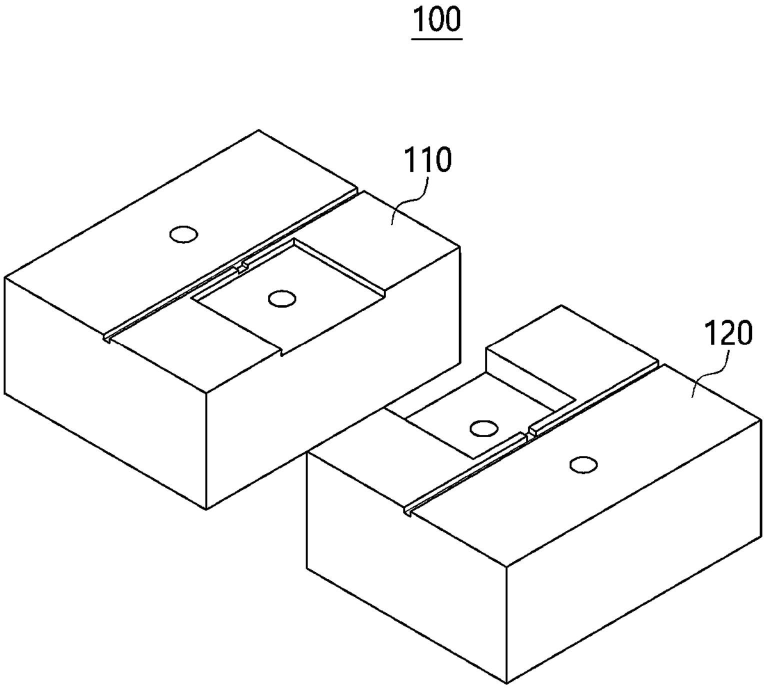
FIG. 1 is a view illustrating a waveguide module according to an exemplary embodiment of the present invention.
Figure 2:
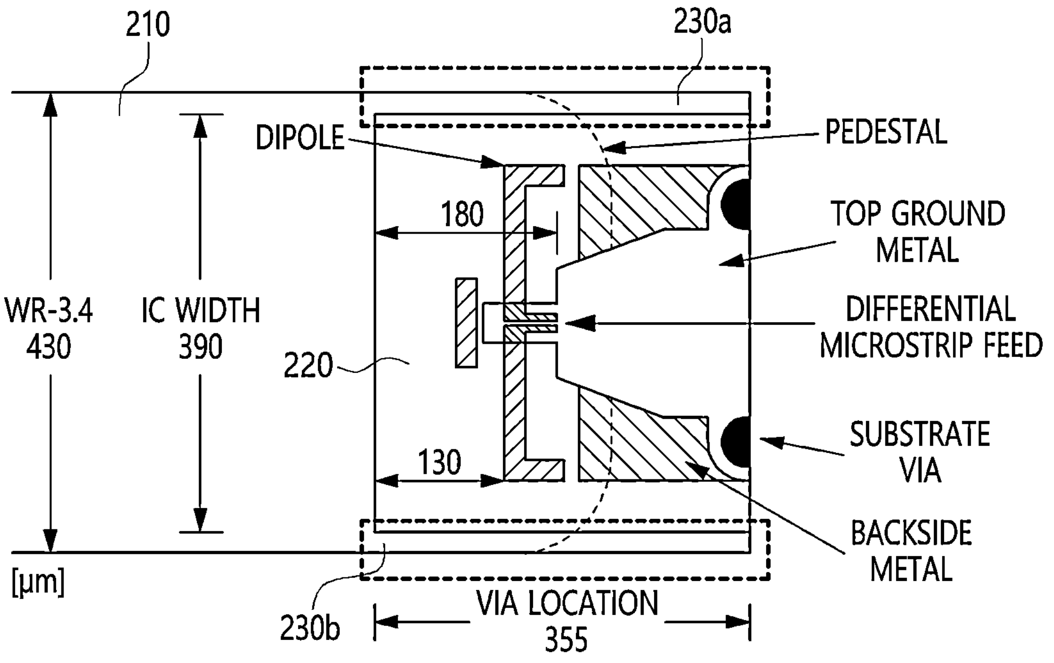
FIG. 2 is an enlarged view of a partial area of a waveguide according to an embodiment of the present invention.
Figure 3:
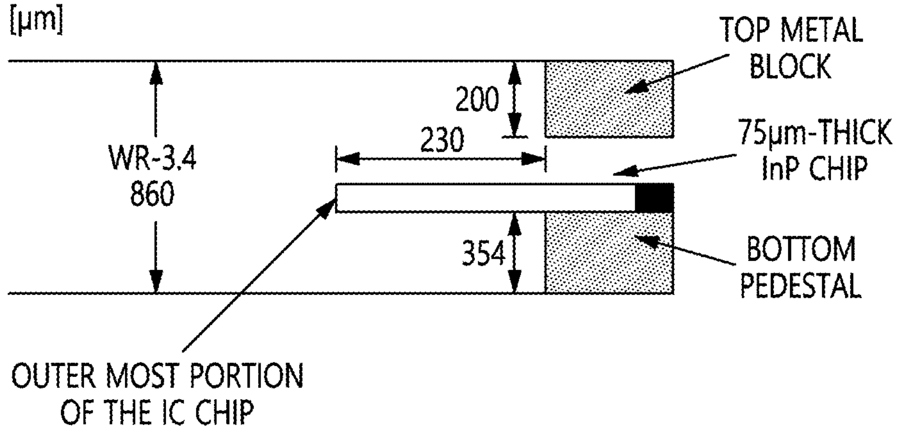
FIG. 3 is a side view of FIG. 2.
Figure 4:
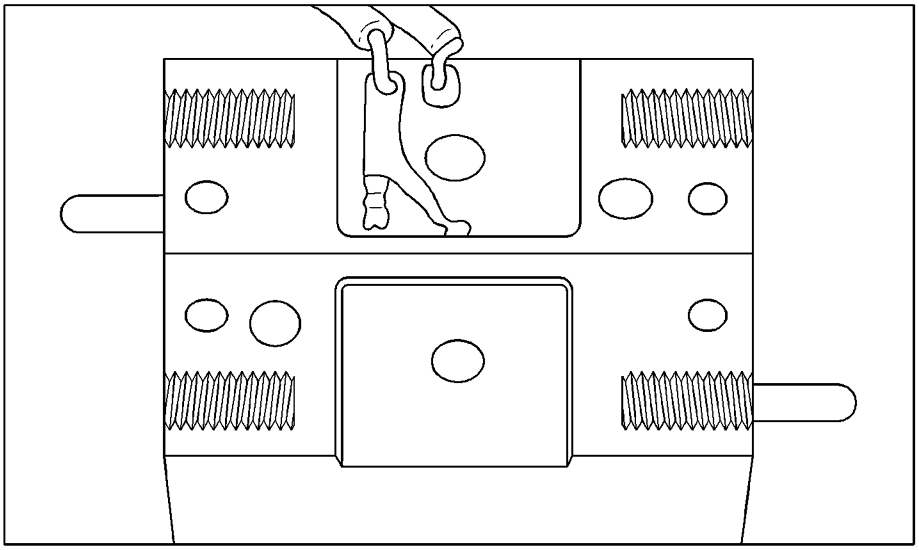
FIG. 4 illustrates a prototype of a waveguide module according to an exemplary embodiment of the present invention.
Figure 5:
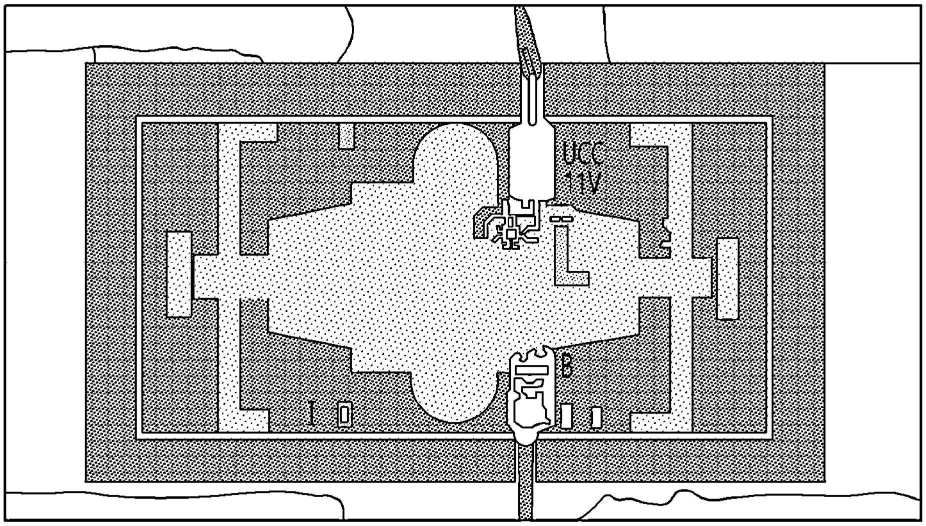
FIG. 5 is a circuit diagram of FIG. 4.
Figure 6:
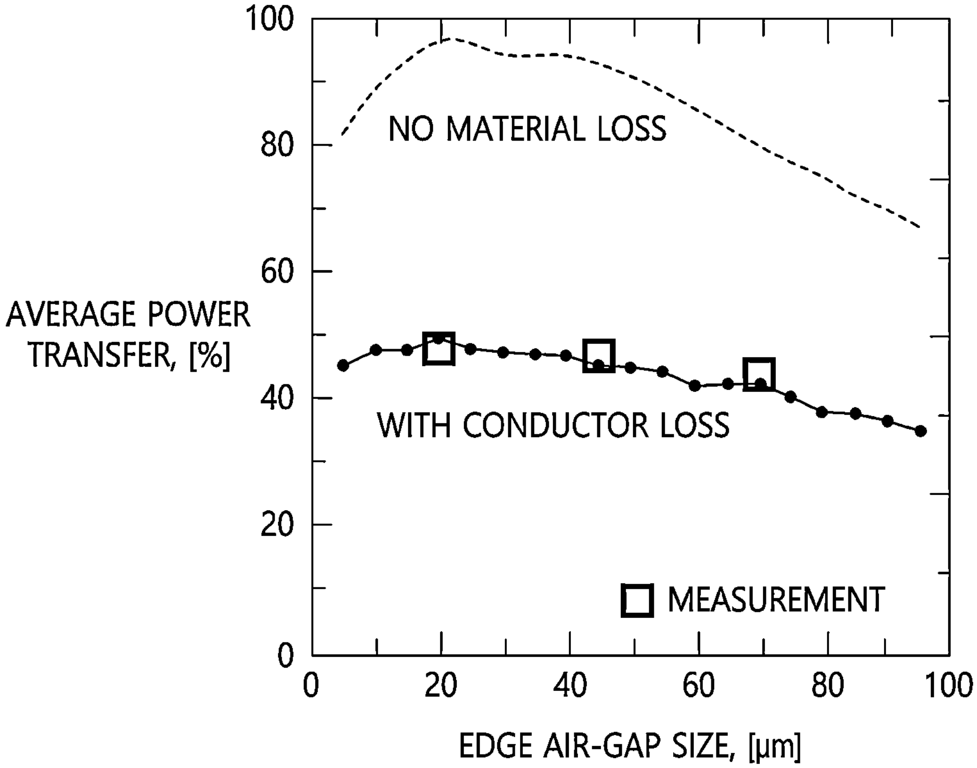
FIGS. 6 and 7 are views illustrating results of experiments on performance changes according to a change in an air gap.
Figure 7:
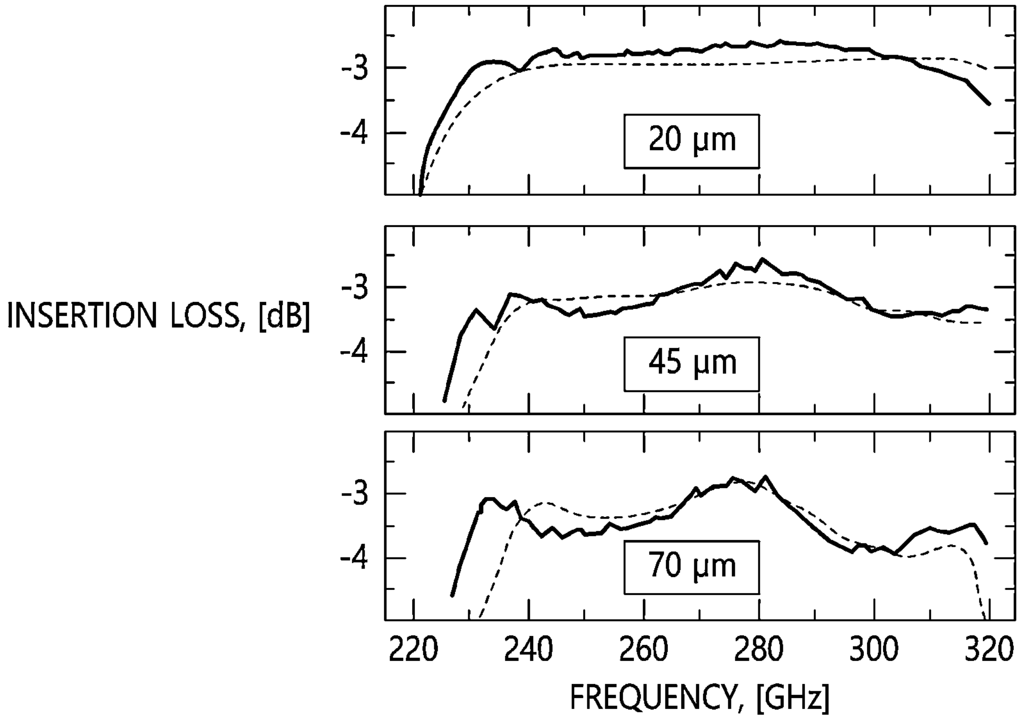
Figure 8A:
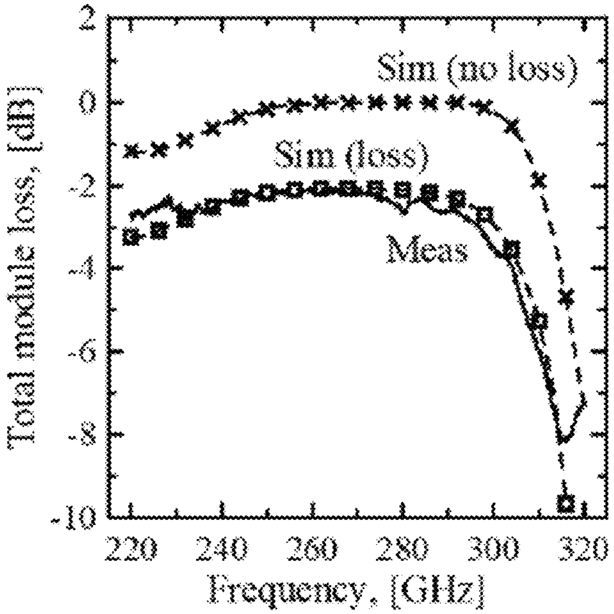
FIGS. 8A and 8B are views illustrating losses for performance and transition of a waveguide module according to an exemplary embodiment of the present invention.
Figure 8B:
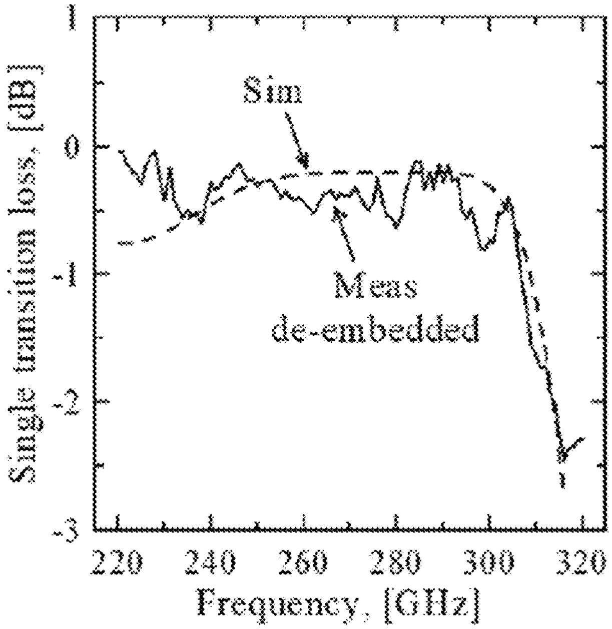
Figure 9:
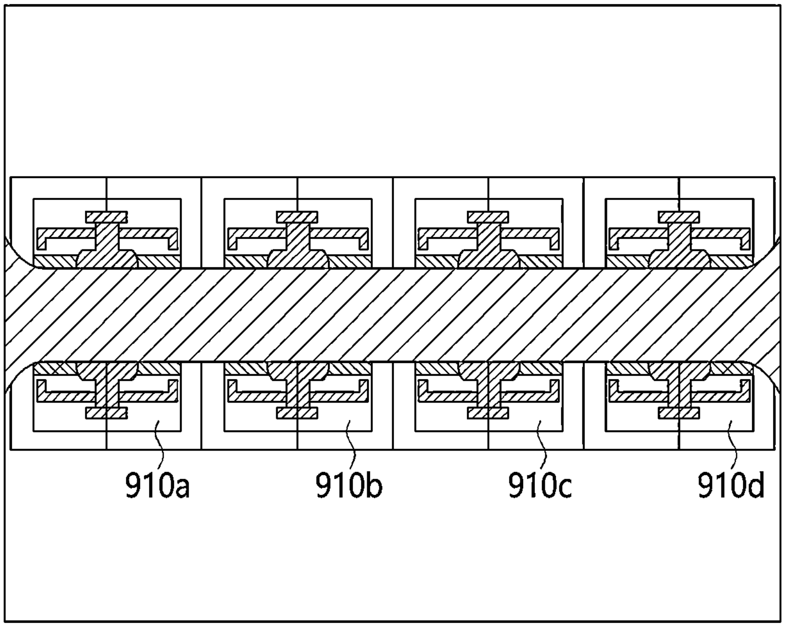
FIG. 9 is a view illustrating a waveguide module according to another exemplary embodiment of the present invention.
Figure 10:
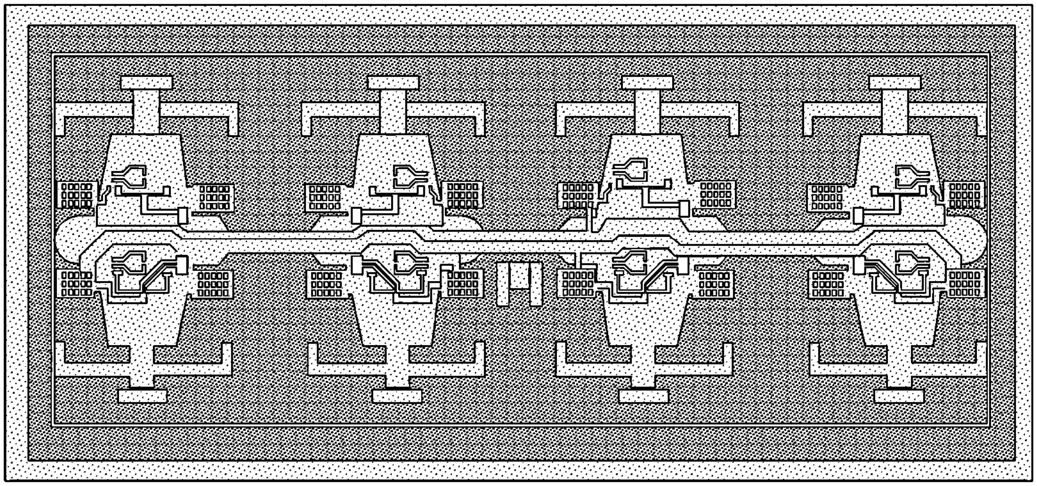
FIG. 10 is a view illustrating an amplifier circuit according to FIG. 9.
Figure 11:
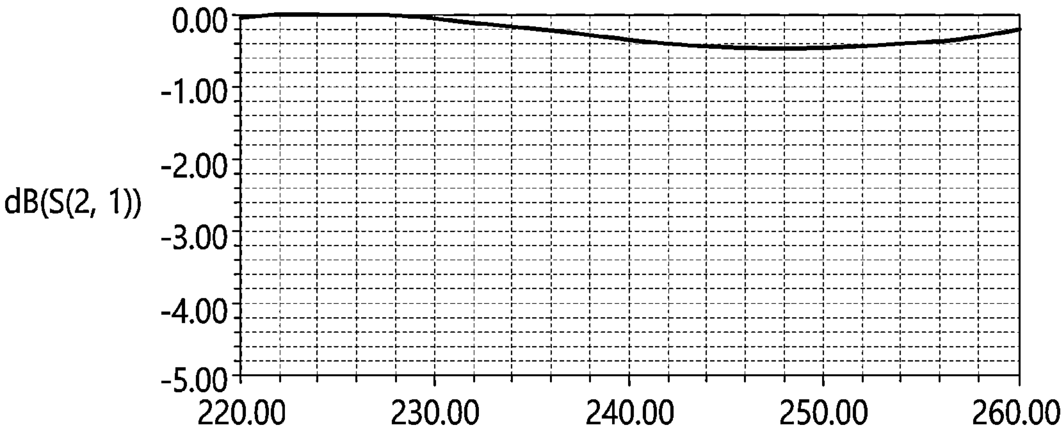
FIG. 11 is a view illustrating standard transition performance.
Figure 12:
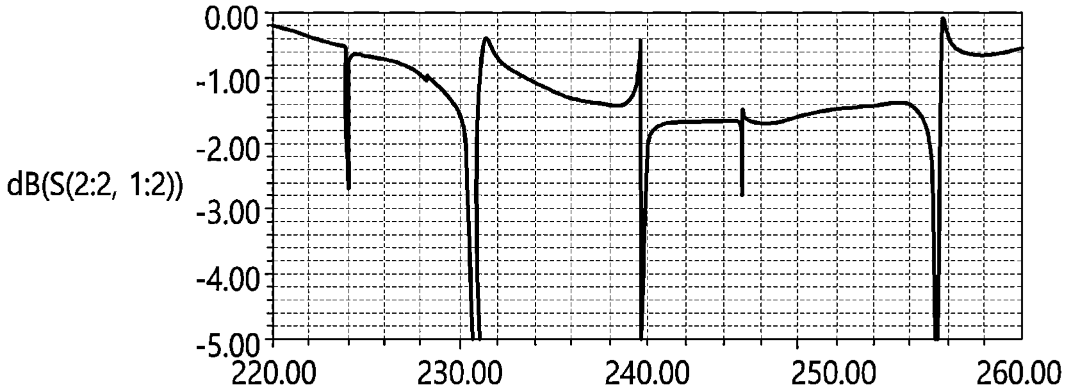
FIG. 12 is a view illustrating performance in the case of using only inner transition.
Figure 13:
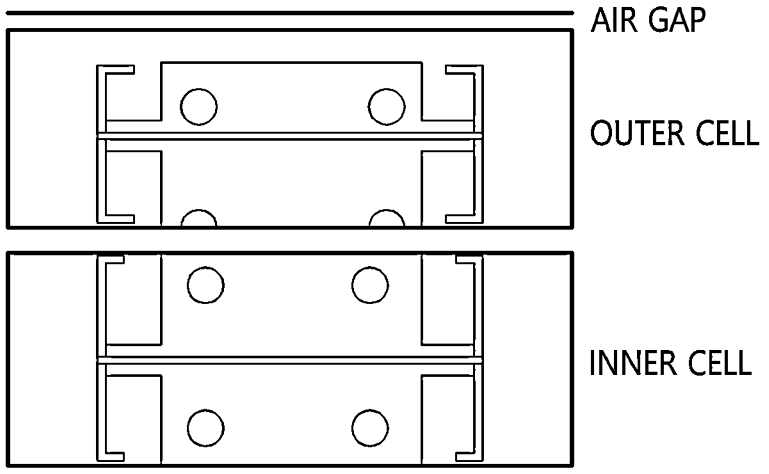
FIG. 13 is a view for explaining antenna transitions of outer and inner circuits in an array circuit according to an exemplary embodiment of the present invention.

FIG. 1 is a view illustrating a waveguide module according to an exemplary embodiment of the present invention, FIG. 2 is an enlarged view of a partial area of a waveguide according to an embodiment of the present invention, FIG. 3 is a side view of FIG. 2, FIG. 4 illustrates a prototype of a waveguide module according to an exemplary embodiment of the present invention, FIG. 5 is a circuit diagram of FIG. 4, FIGS. 6 and 7 are views illustrating results of experiments on performance changes according to a change in an air gap, FIGS. 8A and 8B are views illustrating losses for performance and transition of a waveguide module according to an exemplary embodiment of the present invention, FIG. 9 is a view illustrating a waveguide module according to another exemplary embodiment of the present invention, FIG. 10 is a view illustrating an amplifier circuit according to FIG. 9, FIG. 11 is a view illustrating standard transition performance, FIG. 12 is a view illustrating performance in the case of using only inner transition, and FIG. 13 is a view for explaining antenna transitions of outer and inner circuits in an array circuit according to an exemplary embodiment of the present invention.

Referring to FIG. 1, a waveguide module 100 according to an exemplary embodiment of the present invention includes a first waveguide unit 110 and a second waveguide unit 120.

Here, the first waveguide unit 110 and the second waveguide unit 120 have a structure positioned so as to face each other in upper and lower directions. Since inner structures of the first waveguide unit 110 and the second waveguide unit 120 are the same as illustrated in FIG. 1, the first waveguide unit 110 will be mainly described.

A waveguide having a channel size of a first size is formed in the first waveguide unit 110. The waveguide, which is a WR-3.4 standard waveguide, may operate in a frequency band of 200 to 330 GHz.

The waveguides respectively formed in the first waveguide unit 110 and the second waveguide unit 120 may have a channel size of about 430 μm based on an E-plane.

In the following description, the waveguide should be understood as the first waveguide unit 110 or the second waveguide unit.

An IC chip 220 may be mounted in a predetermined area inside the waveguide 210. In an exemplary embodiment of the present invention, it is assumed that the IC chip 220 is an amplifier circuit and this will be mainly described, but the IC chip 220 is not necessarily limited to the amplifier circuit, and may be applied without limitation to electronic circuits.

The IC chip 220 may be designed to have a width of about 390 μm.

When the IC chip 220 is disposed in a predetermined area inside the waveguide 210, the IC chip 220 may be disposed inside the waveguide 210 with air gaps 230 outside the IC chip 220. Here, the air gaps 230*a* and 230*b* may be formed to be 30 μm or less, preferably 20 μm.

It will be described in more detail with reference to FIG. 2.

FIG. 2 is an enlarged view of a partial area in a state in which the IC chip 220 is disposed inside the waveguide 210, and FIG. 3 is a side view of FIG. 2.

Referring to FIGS. 2 and 3, the IC chip 220 having the width of about 390 μm is mounted inside the waveguide 210 having the channel size of about 430 μm. As illustrated in FIGS. 2 and 3, the IC chip 220 may be coupled without a bonding wire bond or an additional substrate.

For example, the IC chip 220 may be mounted inside the waveguide 210 in a state in which an adhesive material is applied to a rear surface of the IC chip 220 or a predetermined area inside the waveguide 210 where the corresponding IC chip 220 is to be mounted.

The IC chip 220 is disposed inside the waveguide with air gaps of 20 μm on the outside of the IC chip 220. As a result, when the IC chip 220 is coupled to the inside of the waveguide 210, the IC chip 220 may not be damaged. In addition, the air gaps 230*a* and 230*b* may be determined so as not to exceed 30 μm in order not to affect performance of an antenna included in the IC chip 220.

The IC chip 220 is an amplifier circuit, and may include an antenna inside the IC chip 220 to directly transmit/receive radio waves from the waveguide 210. Here, the antenna may be a dipole antenna. The antenna included in the IC chip 220 is designed in consideration of the size of the air gaps 230*a* and 230*b* formed between the IC chip 220 and the waveguide 210.

In addition, a length of the antenna included in the IC chip 220 may be differently designed depending on an operating frequency. Resistance of the antenna may be adjusted by adjusting a length of the substrate and a position of a pedestal in a rear direction.

The radio waves transferred through the waveguide 210 may also be operated in a substrate mode in which the radio waves move along the substrate avoiding the antenna. Accordingly, in an exemplary embodiment of the present invention, a via passing through the substrate may be formed in the substrate of the IC chip 220 to remove the substrate mode. In order to remove the substrate mode, the via may be formed at a position spaced apart from the outermost periphery of the IC chip 220 by 355 μm. The formation position of the via may also vary depending on the size of the IC chip.

According to an exemplary embodiment of the present invention, the IC chip 220 may be designed in a differential form to directly connect the radio waves to the dipole antenna without an additional balun structure.

Power coupling between the waveguide 210 and a microstrip circuit may be performed with a half-wave dipole having a length of 290 μm for a resonance of 270 GHz. An additional parasitic director having a length of 80 μm is included to move a radiation pattern of a dipole in a direction of an input waveguide, but the additional parasitic director may also be removed.

The position of the dipole relative to an edge of the substrate of the IC chip 220 is important because a field is coupled to the substrate before the dipole.

In an exemplary embodiment of the present invention, it is assumed that a dipole antenna is designed assuming a band of 280 GHz. Therefore, the dipole may be positioned at a distance of 130 μm from the edge of the substrate to the dipole, corresponding to a quarter wavelength of 280 GHz.

Forming the air gaps of 20 μm on both sides of the IC chip 220 is very important for a proper operation of the dipole. The air gap helps the dipole achieve an improved matching bandwidth. FIGS. 4 and 5 illustrate a prototype and circuit of a waveguide module according to an exemplary embodiment of the present invention.

FIGS. 6 and 7 illustrate results of experiments on performance changes according to a change in an air gap. The dipole antenna built into the IC chip 220 was designed assuming that the size of the air gap is 20 μm. As illustrated in FIGS. 6 and 7, it may be seen that an average loss according to the change in the air gap does not significantly change. However, it was confirmed that the performance is gradually deteriorated according to the change in the air gap.

Therefore, according to an exemplary embodiment of the present invention, the IC chip 220 is mounted on the waveguide 210 with the air gap of 30 μm or less. Preferably, the air gap may be formed to be 20 μm.

The substrate of the IC chip 220 coupled to various metal patterns induces frequency resonance that hinders an operation of the dipole. Therefore, the resonance of the substrate may be suppressed by forming a substrate via connecting a top ground metal to a backside metal at a specific location as described above.

According to an exemplary embodiment of the present invention, the resonance of the substrate may be suppressed by forming the via at the distance spaced apart from the edge of the substrate by 355 μm as described above.

The top ground metal of the IC chip 220 may be disposed on a 3 μm-thick benzocyclobutene (BCB) layer on a metal signal line including a dipole. Under the signal line, a 75 μm-thick substrate may be positioned on the backside metal bonded to a metal pedestal.

The metal pedestal is positioned at a position spaced apart from the edge of the substrate by 230 μm, and the position of the metal pedestal is very important as it serves as a back shot for the dipole and determines an operating frequency band.

The IC chip 220 has a back-to-back waveguide transition dipole coupled together using differential thru-lines in an area of 390×710 $\mu m^2$. FIG. 8A illustrates the simulated and measured insertion losses for the total thru-line IC module. As illustrated in FIG. 8A, in the case of no material loss, broadband performance with little return loss was predicted.

When the position of the via is formed to be closer to the edge of the substrate from 355 μm to 315 μm, the bandwidth may be extended to include a band of 220 to 320 GHz.

In addition, an insertion loss of 3 dB or more was seen in the range of 220 to 300 GHz, together with an optimal insertion loss of 2.1 dB near 270 GHz. A measured mismatch loss is better than −10 dB in the same frequency range. When the thru-line chip is removed, it shows isolation of 40 dB or more together with a reflection of about −0.7 dB.

As illustrated in FIG. 8B, it may be seen that an estimated insertion loss of 0.5 dB occurs for a single structure.

FIG. 9 is a view illustrating a waveguide module according to another exemplary embodiment of the present invention, and FIG. 10 is a view illustrating an amplifier circuit according to FIG. 9.

As illustrated in FIG. 9, according to another exemplary embodiment of the present invention, the IC chip 220 mounted in a predetermined area inside the waveguide 210 may include N (natural number) circuit units 910*a*, 910*b*, 910*c*, and 910*d*. Here, it should be understood that the IC chip including the N array circuits is mounted in an extended waveguide rather than a standard waveguide.

Each of the N circuit units (cells) 910*a*, 910*b*, 910*c*, and 910*d* may be designed to have the same width. In this case, (N−2) inner circuit units among the N circuit units 910*a*, 910*b*, 910*c*, and 910*d* do not have air gaps above and below each of the circuit units as illustrated in FIG. 9.

On the other hand, two outer circuit units have an air gap on one surface of each of the circuit units.

In designing all of the N circuit units 910*a*, 910*b*, 910*c*, and 910*d* to have the same width, the circuit unit with an air gap may be designed to have the same width as a circuit unit without an air gap.

As illustrated in FIG. 9, the (N−2) inner circuit units and the two outer circuit units among the N circuit units require antennas to be operated in different environments due to the air gaps.

Therefore, a plurality of circuit units 910*a*, 910*b*, 910*c*, and 910*d* may be designed into two types: an antenna in which no air gap exists therein and an antenna in which an outer air gap exists.

When all the antennas in each of the circuit units 910*a*, 910*b*, 910*c*, and 910*d* designed differently according to the presence or absence of the air gap normally operate, all the circuit units may absorb radio waves without reflection.

In this way, as the IC chip 220 is mounted inside the waveguide with the air gap, the array circuits integrated into a single chip need to be differently designed depending on the presence or absence of the air gap as each of the antennas included in the inner circuit unit and the outer circuit unit operates in different environments depending on the presence or absence of the air gap.

FIG. 11 is a view illustrating standard transition performance, FIG. 12 is a view illustrating performance in the case of using only inner transition, and FIG. 13 is a view for explaining antenna transitions of outer and inner circuits in an array circuit according to an exemplary embodiment of the present invention.

An inner transition has a structure and characteristics similar to a standard transition in a single module, but an outer transition has a fundamental structural difference from the inner transition due to an unbalanced shape caused by the air gap (see FIG. 13).

Therefore, according to an exemplary embodiment of the present invention, when a single IC chip 220 includes an array circuit, the inner circuit unit and the outer circuit unit may be differently designed in consideration of the presence or absence of the air gap.

Figure 14:
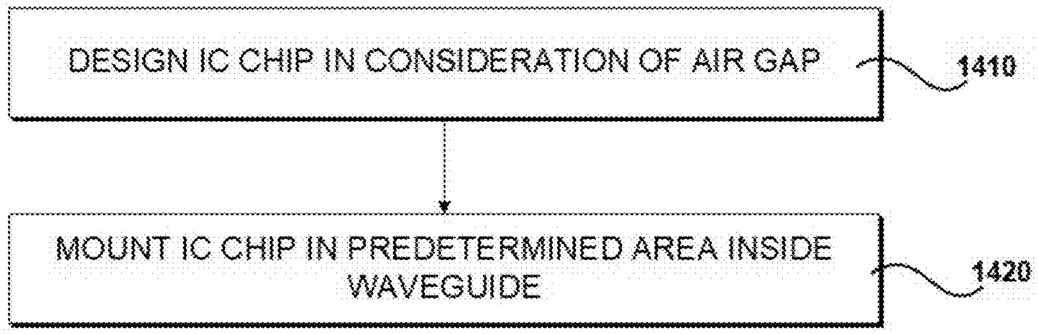
FIG. 14 is a flowchart illustrating a method of mounting an IC chip in a waveguide according to an exemplary embodiment of the present invention.

FIG. 14 is a flowchart illustrating a method of mounting an IC chip in a waveguide according to an exemplary embodiment of the present invention.

In step 1410, an IC chip is designed.

Here, since the IC chip is mounted in a predetermined area inside the standard WR-3.4 waveguide as described above, the IC chip may be designed with a predetermined width.

In addition, the IC chip includes an antenna, and the antenna may be designed in consideration of an air gap. In addition, a via may be formed in the IC chip 220 to remove resonance of the substrate, and may be formed at a position spaced apart from an outer portion of the substrate by 355 μm.

Other detailed structures of the IC chip 220 are the same as those described with reference to FIGS. 1 to 10, and thus duplicate descriptions will be omitted.

In step 1420, the IC chip is mounted in a predetermined area inside the waveguide.

In this case, the IC chip 220 may be mounted in the predetermined area inside the waveguide 210 with an air gap. The IC chip 220 may be coupled inside the waveguide without a bonding wire.

Hereinabove, the present invention has been mainly described with reference to exemplary embodiments thereof. It will be understood by those skilled in the art to which the present invention pertains that the present invention may be implemented in a modified form without departing from essential characteristics of the present invention. Therefore, the disclosed embodiments should be considered from a descriptive point of view rather than a limiting point of view. The scope of the present invention is shown in the claims rather than the foregoing description, and all differences within the equivalent scope will be construed as being included in the present invention.

What is claimed is:

1. A waveguide module comprising:

a waveguide channel having a channel size of a first size based on an E-plane; and an integrated circuit (IC) chip having a width of a second size and disposed at a predetermined position inside the waveguide channel, wherein the IC chip is disposed inside the waveguide channel with air gaps outside the IC chip;

wherein the air gaps are set to 30 μm or less; and wherein the IC chip includes a dipole antenna.

2. The waveguide module of claim 1, wherein the waveguide channel is a rectangular waveguide channel, and the first size is greater than the second size.

3. The waveguide module of claim 1, wherein the air gaps are formed at the top and bottom of the IC chip, respectively.

4. The waveguide module of claim 1, wherein the IC chip is formed with a via for suppressing dielectric resonance inside the IC chip, and the via is formed at a distance spaced apart from an outermost portion of the IC chip by 355 μm.

5. The waveguide module of claim 1, wherein the IC chip is formed with an amplifier circuit or an array circuit including a plurality of amplifier circuit units.

6. The waveguide module of claim 5, wherein two amplifier circuit units positioned outside the array circuit among the plurality of amplifier circuit units included in the array circuit have an antenna structure designed differently from the plurality of amplifier circuit units positioned inside the array circuit due to the air gap.

7. A method of mounting an integrated circuit (IC) chip in a waveguide channel, the method comprising:

a first process of providing the IC chip having a dipole antenna; and a second process of mounting the IC chip in a predetermined area inside the waveguide channel, the IC chip being mounted inside the waveguide channel so as to have air gaps outside the IC chip without a bonding wire, wherein the waveguide channel has a channel size of a first size based on an E-plane, and the IC chip has a width of a second size, and wherein the air gaps are set to 30 μm or less.

* * * * *